(12) United States Patent
Trafas (10) Patent No.: US 7,407,069 B1
(45) Date of Patent: Aug. 5, 2008

(54) FISHING STRINGER WITH MULTIPLE INTEGRAL FISHING TOOLS

(76) Inventor: Paul J. Trafas, 241 Jefferson Ave., St. James, NY (US) 11780

( * ) Notice: Subject to any disclaimer, the term of this patent is extended or adjusted under 35 U.S.C. 154(b) by 251 days.

(21) Appl. No.: 11/165,998

(22) Filed: Jun. 24, 2005

(51) Int. Cl.
*A01K 1/00* (2006.01)
(52) U.S. Cl. ............................. 224/103; 43/4
(58) Field of Classification Search ........... 43/4, 43/5; 224/103
See application file for complete search history.

(56) References Cited

U.S. PATENT DOCUMENTS

| | | | | |
|---|---|---|---|---|
| 1,417,759 | A * | 5/1922 | McNiece | 224/103 |
| 2,536,531 | A * | 1/1951 | Bishop | 224/103 |
| 3,434,231 | A | 3/1969 | King | |
| 3,694,014 | A * | 9/1972 | Rossbach et al. | 289/17 |
| 3,713,243 | A | 1/1973 | Tetzner | |
| 4,484,368 | A | 11/1984 | Thompson | |
| 4,830,244 | A | 5/1989 | Brannon | |
| 4,947,576 | A | 8/1990 | Hull et al. | |
| 4,960,231 | A * | 10/1990 | Popovich | 224/103 |
| 5,228,226 | A * | 7/1993 | Porosky | 43/5 |
| 5,735,071 | A * | 4/1998 | Gouldie et al. | 43/4 |
| 6,038,808 | A | 3/2000 | Bergeron et al. | |
| 6,898,891 | B1 * | 5/2005 | Needham | 43/4 |
| 2003/0141326 | A1 * | 7/2003 | Bennett | 224/103 |
| 2004/0140331 | A1 * | 7/2004 | Yarbrough | 224/103 |
| 2005/0077328 | A1 * | 4/2005 | Perttu | 224/103 |

* cited by examiner

*Primary Examiner*—Kimberly S Smith
(74) *Attorney, Agent, or Firm*—Island Patent; F. Scott Tierno (57) ABSTRACT

A fishing stringer is structured with multiple fishing related tools integrated into a tether and an elongated member of the stringer. Specifically, the elongated member acts as a standard retention bar, while also providing a hook disgorger tool at a first end, and a fishing line cutting tool at a second end. Similarly, the tether acts as a normal stringer' tether, while also incorporating a measuring capability along a substantial length of the tether. Once the tether and stringer are deployed, each of the integrated tools, including the line cutter, the disgorger, and the measuring tape, are also thereby fully available for convenient and immediate use—without any risk of being dropped and lost. This abstract is provided to comply with rules requiring an abstract, and is submitted with the intention that it will not be used to interpret or limit the scope and meaning of the claims.

16 Claims, 5 Drawing Sheets

FISHING STRINGER WITH MULTIPLE INTEGRAL FISHING TOOLS

TECHNICAL FIELD

The present invention relates most generally to fishing tools and aides. More particularly, the invention relates to a multi-function fishing tool usable by an individual engaging in fishing activities.

BACKGROUND

Fishermen typically employ a variety of tools while engaging in fishing activities. In addition to a fishing pole, a variety of commonly utilized fishing tools include a fishing line cutter, a fish hook disgorging device, a measuring means such as a measuring tape, and a fish stringer means for holding caught fish. As such, it is common for individuals that are fishing to have a plurality of tools available, sometimes even wearing clothing with numerous pockets and pouches to hold the tools/devices. However, constantly having to reach into ones pockets, is at best inconvenient. In addition, it is easy to drop and loose a number of commonly employed fishing tools, especially when trying to hold on to a fishing pole while endeavoring to accomplish other fishing related tasks.

Accordingly, it would be most desirable to have a multi-function fishing tool that is always within easy reach, and which can be employed to replace a number of commonly employed fishing tools and devices. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF THE INVENTION

In accordance with the present invention, a multi-function fishing tool includes a tether having a first end and a second end, and an elongated member. Preferred embodiments of the invention are configured with the elongated member fixedly coupled to the first end of the tether proximate at a middle portion of the elongated member. The second end of the tether, which may be termed a proximal end, includes a mechanical arrangement structured for enabling the second end to be secured to an item worn by the user. Accordingly, the second end of the tether of the invention is securely attached to the item and the user during fishing activities. It should be noted that the expression 'an item worn by the user' may include any suitable item including a belt, a loop on a pair of shorts or pants, or any other suitable item that may be worn or fixed to a user for securing the second end of the tether. For example, a most basic arrangement might employ a pre-formed loop located at the second end of the tether, with a belt worn by a user passing through the tether loop and secured thereby. Alternately, the second end of the tether may be fixed to a d-ring, which may be used to securely couple the second end of the tether to an item worn by the user, possibly using a lockable clip like device.

A most preferred embodiment of the invention provides for including an elongated member possibly structured with one or more 'tools' provided at one or both ends thereof. For example, a preferred elongated member may be structured having a first end, a second end, and a middle portion therebetween. Additionally, the first end may be structured to provide a hook disgorger, while the second end may be configured as a fishing line cutter.

A most preferred elongated member may be provided with a somewhat tube-shaped member, with the first end thereof substantially open and providing a disgorger formed by two substantially diametrically opposed notches formed in a wall structure of the elongated member. A first notch is preferably provided having a notch depth that is at least two multiples deeper than a second provided notch—with this arrangement providing one notch that is 'substantially deeper' than a second notch. In addition, or alternately, the second (opposite) end of the elongated member may be structured with a fishing line cutter. A desirable fishing line cutter is one that will safely cut fishing line, without any moving parts, and without having dangerously sharp edges exposed. A most preferred fishing line cutter of the invention is formed at the (possibly open) second end providing two or more opposed notches having recessed center portions. At least one of the included notches is structured with a sharp edge provided within the recessed center portion, which may be employed for safely cutting fishing line.

Another important feature providable with preferred embodiments of the invention calls for including a measuring tape. The measuring tape may most preferably be fixed to, and extends along a substantial longitudinal length of the tether. Such a measuring tape enables a user or other nearby individual to readily verify the size of a caught fish—without having to take out or reach for a separate measuring tape. For example, a possibly most preferred embodiment of the multi-function fishing tool of the invention may be configured with a tether that is provided by a flattened elongated strap, having a first side and a second side. At least one measuring tape may then be placed along the longitudinal length of the tether, superposing at least one of the first side or the second side of the strap, and fixed thereto in a permanent fashion. Although skilled persons may provide additional approaches for permanently fixing the measuring tape to the elongated tether, one simple approach would be to simply sew a measuring tape to one or both sides of the tether.

A most preferred tether of the invention may be provided having a length in the range of 75 inches to 85 inches—although other lengths may be employed. A preferred length of the measuring tape would be at least 60 inches long. These lengths of tether and measuring tape enable the multi-function fishing tool of the invention to be employed as a fish stringer for caught fish, a convenient measuring means for determining if a just caught fish is a 'keeper' or not, while also possibly aiding in disgorging a hook from a fishes mouth and or selectively cutting fishing line when needed.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

Partial List Of Reference Numerals

| | |
|---|---|
| 10 | multi-function fishing tool |
| 12 | loop or loop means |
| 14 | elongated member |
| 14a | first end of 14 |
| 14b | second end of 14 |
| 14-1 | disgorging tool |
| 14-1a | first (deep) notch in 14-1 |
| 14-1b | second (shallow) notch in 14-1 |
| 14-2 | line cutter tool |
| 14-2a, 14-2b | notches formed in 14-2 |
| 14-2bb | recessed cutting edge |
| 20 | tether |
| 20a | first end of 20 |
| 20b | second end of 20 |
| 20-1 | tether (alternate) |
| 20-1a | course length marking |
| 20-1b | medium length marking |
| 20-1c | fine length marking |
| 26 | measuring tape of 20 |
| 40 | ring clip |
| 50 | bunching strap |
| 50 | bunching strap |
| 100 | individual fishing |
| 102 | body of water |
| 104 | fishing pole |
| 110 | caught fish |

DETAILED DESCRIPTION OF EMBODIMENTS OF THE INVENTION

It is important to establish the definition of a number of descriptive terms and expressions that will be used throughout this disclosure. The term 'tether' is to be broadly defined and may be provided by any elongated and suitably flexible item. For example, a preferred tether may be provided as a strap, a cable, a rope, etc. Importantly, the elongated member should be flexible and strong enough for the tasks described hereinafter. The term 'user' may be any person using the invention during fishing or other chosen activities. Accordingly, a most typical user would be an individual that is fishing, either upon a boat or at a shoreline. When referring to a plurality of notches, the expression "one notch substantially deeper than a second notch" may be assumed to indicate that one notch is most preferably, at least two multiples, or equivalently two times the deeper than the other. As such, if a first notch is 0.25 inches deep, a second substantially deeper notch may be at least 0.50 inches deep. In addition, the shape of a notch may be varied, and certainly include v-shaped and or u-shaped notches. The terms 'coupled', 'coupled to', 'being coupled to', etc., are to be understood to mean that two or more described items are either directly connected together, or alternately, connected to each other via one or more additional, possibly implied or inherent structures or components. For example, when considering the securing of the first end of the tether to an elongated member of the invention, the tether may be directly connected to the elongated member, or alternately, connected via one or more additional mechanical items and or structures—which would be well known to skilled persons. Other important terms and definitions will be provided, as they are needed, to properly define the present invention and its associated novel characteristics and features.

Figure 1:
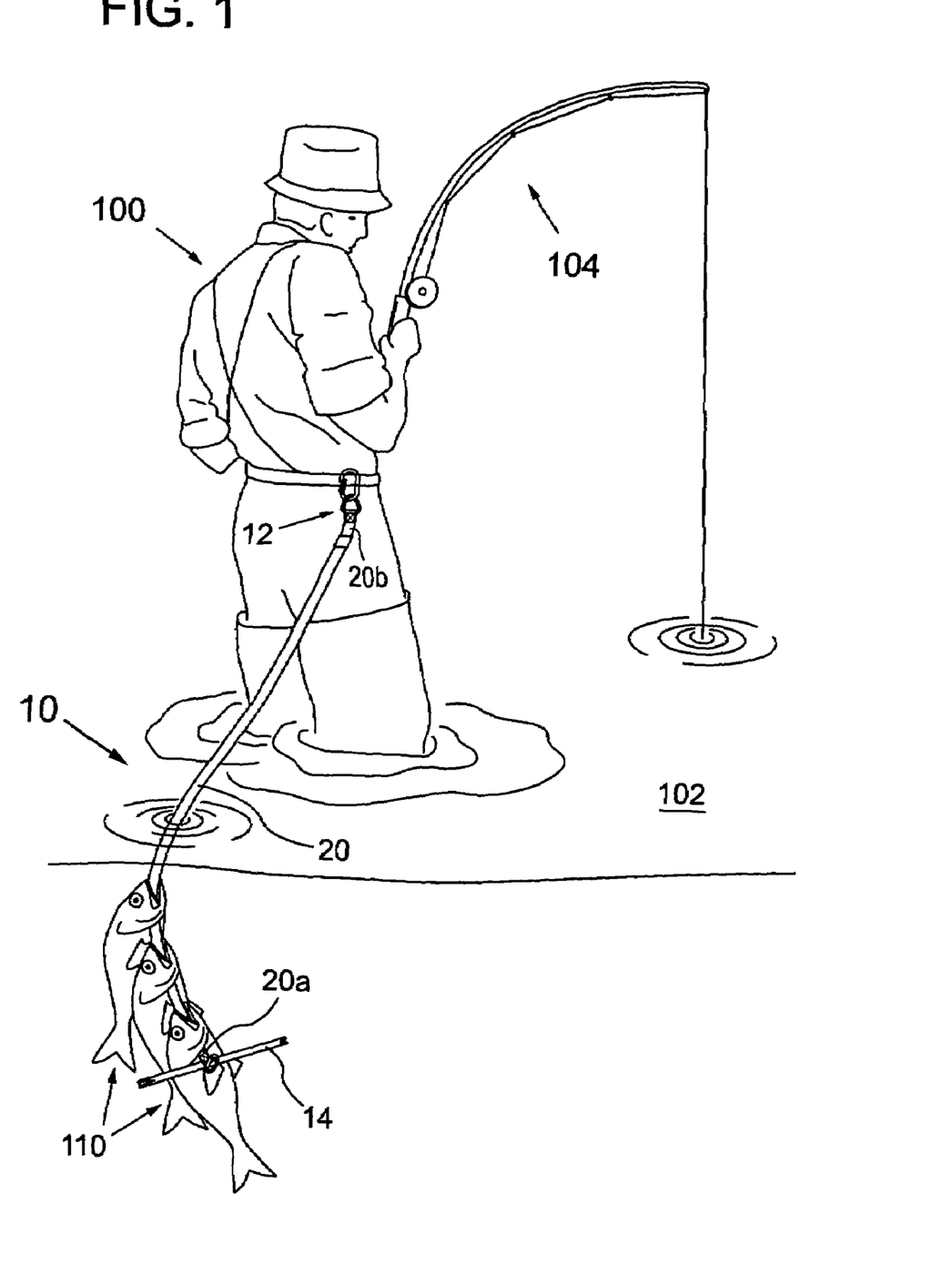
FIG. 1 illustrates an individual successfully fishing with gear including a preferred embodiment of the present invention.

Referring now to the drawings, FIG. 1 shows an individual using the present invention during fishing activities. As shown, the user is fishing with a fishing pole 104 while wading in a body of water 102, and the individual has caught several fish 110. An embodiment of a multi-function fishing tool 10 in accordance with the present invention includes a tether 20 having a first end 20a and a second end 20b, and further includes an elongated member 14. The first end 20a of the tether 20 is fixedly coupled to the elongated member 14. The second end 20b of the tether 20 is arranged for being securely coupled to an item or piece of gear worn by the user. Several exemplary arrangements for securing and fixedly coupling the second end of the tether 20 to the user will be discussed hereinafter.

Figures 2A, 2B, 3:
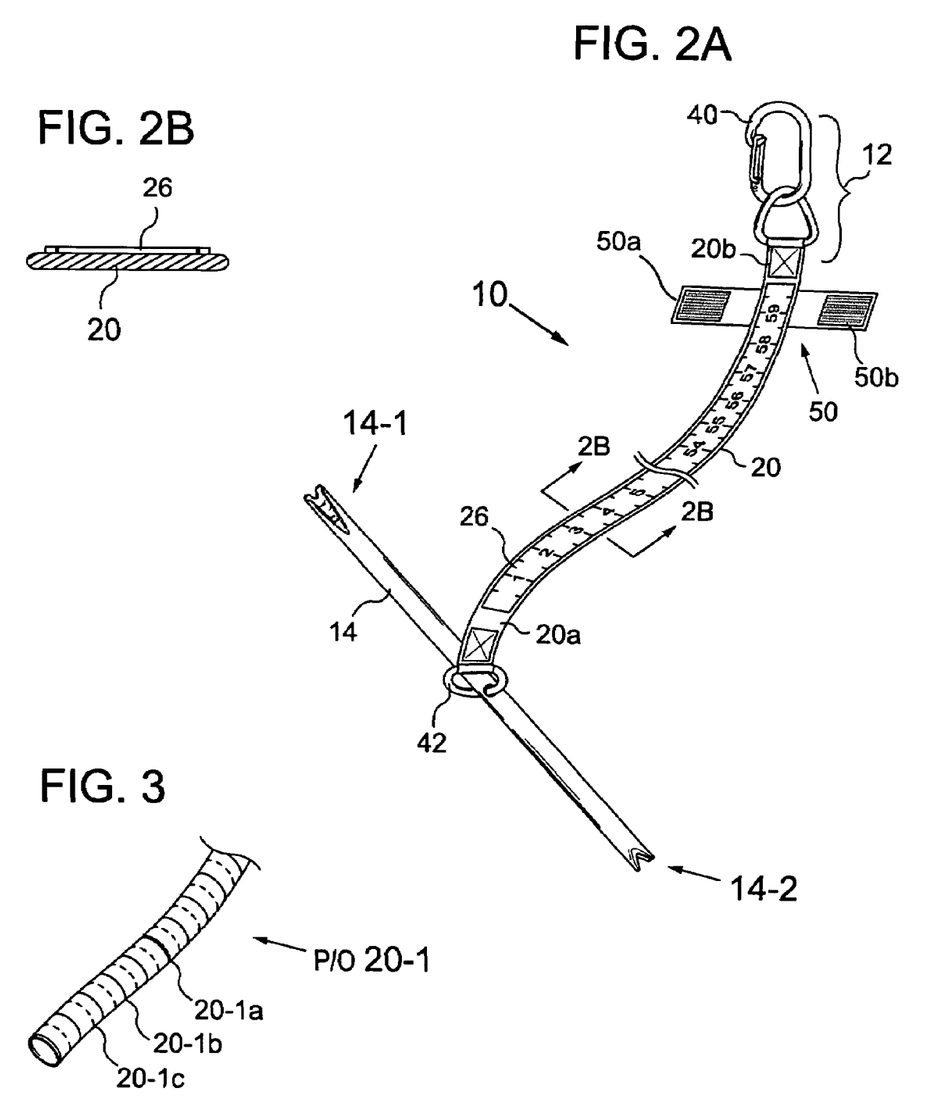
FIG. 2A provides a more detailed view of a possibly most preferred embodiment of the invention.
FIG. 2B illustrates a cross sectional view of an embodiment of a substantially flattened tether of the invention, taken along the line 2B-2B, as shown in FIG. 2A
FIG. 3 depicts an alternate tether providable with embodiments of the invention, which as shown is structured having a more rounded (and not flat) cross section, for example, as providable by a rope, chord, cable, etc.

Turning now to FIG. 2A, a first preferred embodiment of the multi-function fishing tool 10 is illustrated. The tether 20 is depicted as an elongated and flattened item. A most preferred embodiment of the tether 20 would be provided by a flexible, strong, and long lasting material, which can stand up to repeated exposures to fresh and salt water environments. A most preferred material may be found in ¾" to 1" wide poly or nylon webbing. At the first end 20a of the tether 20, the elongated member 14 is fixedly attached by any of a variety of possible arrangements. For example, one preferred arrangement may include a sewn loop securing the first end of the tether to a suitable metal ring, such as a d-ring. Skilled individuals will appreciate the varying ways that the first end 20a of the tether 20 can be securely coupled to a portion of the elongated member 14 in a convenient and long lasting fashion.

As clearly illustrated in FIGS. 1 and 2A, the second end 20b of the tether 20 is arranged for being secured, at least for a period of time while fishing, to gear worn by a user. For example, a simple loop or loop means 12 may be provided at the second end 20b of the tether 20 that may be looped through or otherwise coupled to a belt or a belt loop of an item worn by the user. Alternately, a more substantial structure may be provided at the second end 20b of the tether 20. One preferred configuration calls for a d-ring to be fixed at the second end of the tether. Additionally, a clip means, such as an openable ring clip 40, may be provided for convenience in selectively hooking and unhooking the second end 20b of the tether 20 to the user as needed.

Also shown in FIG. 2A, as well as FIG. 2B, is a measuring tape 26, which may be provided superposing at least one of the two sides of a flattened embodiment of the tether 20, and fixed to and extending along a substantial longitudinal length of the tether 20. This arrangement of the measuring tape 26 being provided along a substantial length of the tether 20 readily enables the user to verify the size of a caught fish without having to reach for a separate and additional item.

Accordingly, a most preferred embodiment of the multi-function fishing tool 10 in accordance with the present invention may be structured with the tether 20 is provided by a flattened elongated strap having a first flattened side and a second flattened side (as shown in FIGS. 2A and 2B). Additionally, a measuring tape may be included that is superposing at least one of the first side and the second side of the elongated strap, and preferably permanently fixed thereto. For example, the measuring tape 26 may be formed within the tether strap, or simply be sewn directly to the tether (see FIG. 2B). A most preferred tether 20 would have a length in the range of 75 inches to 85 inches, with the measuring tape 26 portion being at least 60 inches long. It should be understood that the tether 20 need not necessarily be flat, and may be provided, as shown in FIG. 3, as a tether 20-1, having a substantially round cross-section. In addition, although a measuring tape may be attached to the tether 20-1, it is certainly contemplated that the measuring tape may be formed within the tether 20-1, by providing course length markings 20-1a, intermediate length markings 20-1b, and fine length markings, 20-1c. For example, the length markings 20-1a may be foot markings, while the length markings 20-1c may be one-half inch markings.

Figure 4:
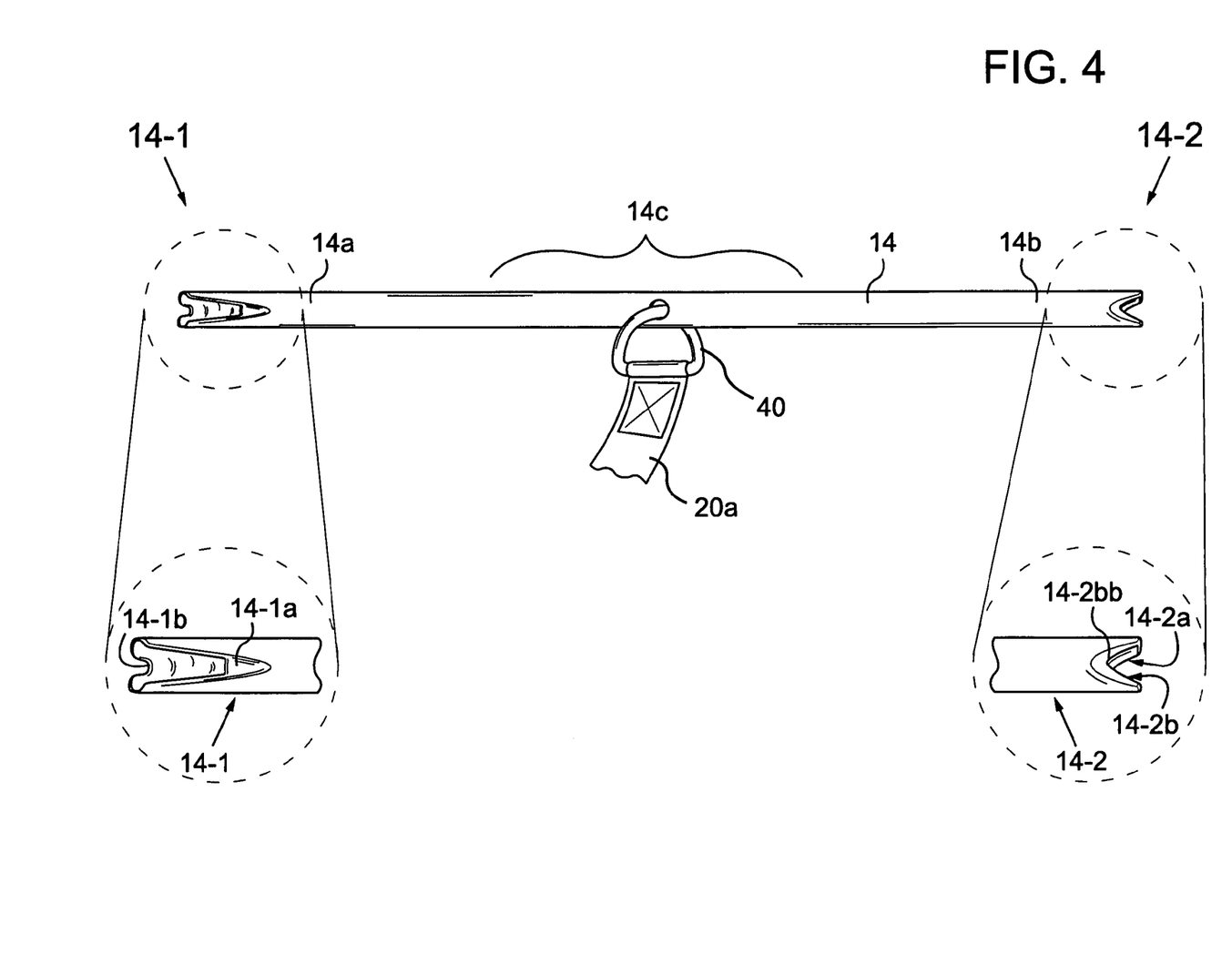
FIG. 4 illustrates a preferred embodiment of an elongated member of the present invention structured with a fishing line cutter and a hook disgorger at opposite ends of the elongated member.

Referring now to FIG. 4, there is illustrated therein a hand held multi-function fishing aide structured with an elongated member 14, having a first end 14a, a second end 14b, and a middle portion 14c. As shown, preferred embodiments of the multi-function fishing tool of the invention are constructed with the elongated member 14 fixedly coupled to the first end 20a of the tether 20, preferably proximate to the middle portion 14c thereof. In addition, the elongated member 14 may be structured to provide at least one of:

a) a hook disgorger 14-1 provided at the first end 14a of the elongated member 14; and b) a fishing line cutter 14-2 provided at the second end 14b of the elongated member.

As clearly shown in FIG. 4, as well as in other figures, the disgorger 14-1 and fishing line cutter 14-2 are formed with safety in mind. Accordingly, although these two items may be structured with more complex and or known arrangements, which are certainly considered within the scope of the present invention, the most preferred embodiments of the disgorger 14-1 and fishing line cutter 14-2 are formed with dulled end structures, with all sharp and or cutting edges recessed within recesses of included notches. For example, consider the embodiment of elongated member 14 of FIG. 4, which is provided formed of a tube-like elongated member having a two substantially open ends, first end 20a and second end 20b. The disgorger 14-1 is embodied at the first end 14a by two substantially diametrically opposed notches. As shown, a most preferred disgorger 14-1 is structured with one notch 14-1a formed having a notch depth that is at least two or more multiples deeper than the second notch 14-1b. Skilled persons will appreciate such a structure provides a safe arrangement for removing a hook from the mouth of a fish, while not employing particularly pointed or sharp portions.

Returning to FIG. 4, there is further illustrated a fishing line cutter 14-2 provided at the open second end 14b of a preferably tube-like elongated member 14. The fishing line cutter 14-2 is most preferably formed in the second end 14b by providing at least two opposed notches. A possibly most preferred embodiment of the fishing line cutter 14-2 is structured with two diametrically opposed notches, such as notch 14-2a and notch 14-2b. Most preferable notches may be formed as at least one of u-shaped or v-shaped, having concaved recesses, which are possibly curved. Additionally, at least one notch is formed having within recesses of the notch a sharpened or sharp edge 14-2bb. Importantly, the sharp edge 14-2bb is recessed, making it difficult, if not impossible, for the user to inadvertently be cut during fishing activities.

Figure 5A:
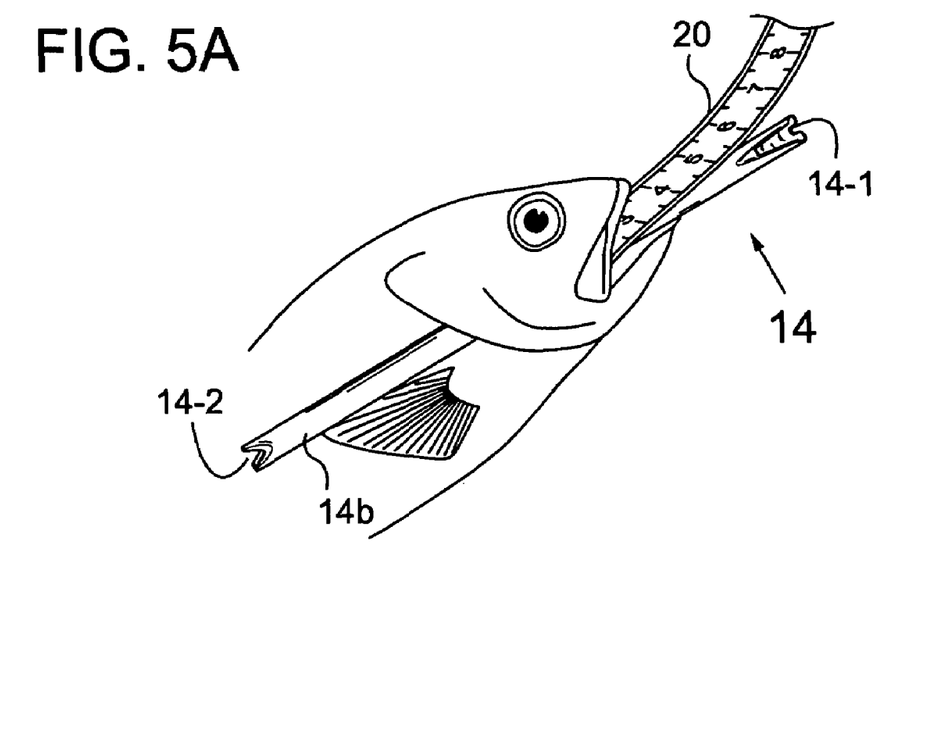
FIGS. 5A and 5B depict how the multi-function fishing tool of the invention is employed as a stringer for holding caught fish.

It should be understood that although depicted as tube-like in FIGS. 2B, 4, 5A, etc., with the elongated member 14 shown having a substantially round cross-section, an elongated member 14 may be provided having other cross-sectional shapes including elliptical, oblong, square, rectangular, etc.

Figure 5B:
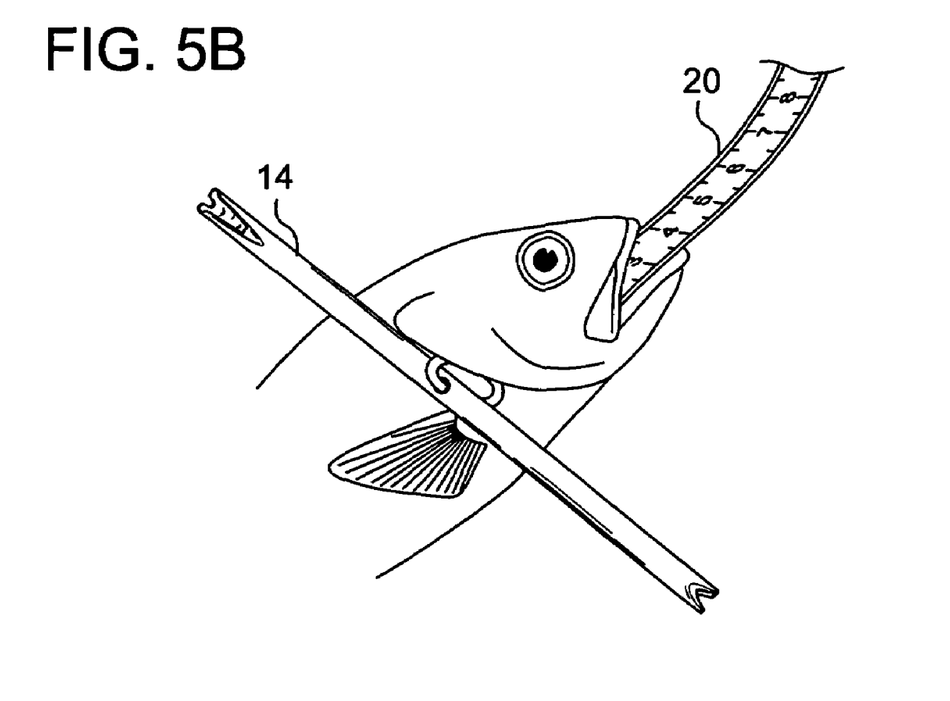
Figure 6:
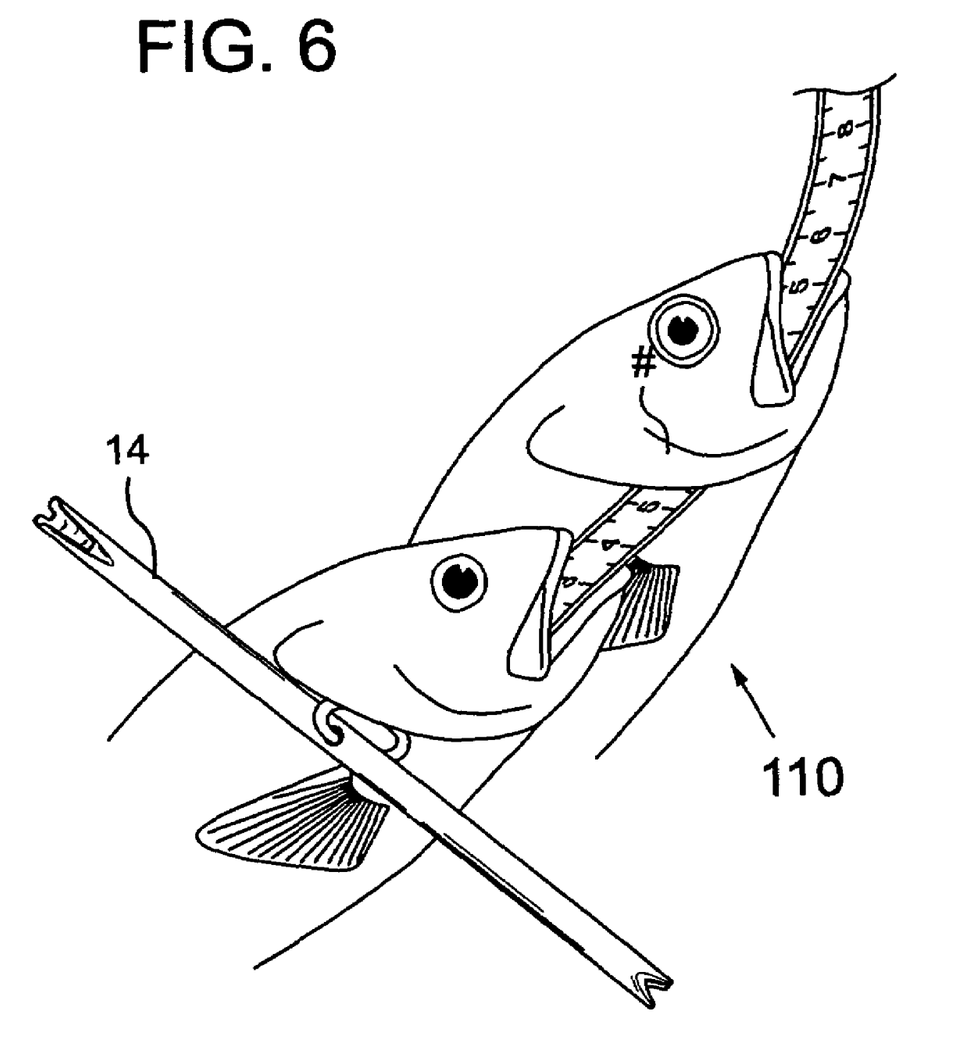
FIG. 6 provides a close-up view of two fish being held securely by an embodiment of the multi-function fishing tool of the invention.

Referring now to FIGS. 5A and 5B, the multi-function fishing tool 10 of the invention may be employed as a fish stringer to securely hold a plurality of caught fish. In addition, the present invention can be employed safely, with virtually no chance of loosing the stringer and or previously caught fish—which is generally not the case with prior art stringers. As shown, the elongated member 14 may be fed into the mouth of a caught fish (FIG. 5A), and pushed through the gill passages. Once the elongated member 14 passed through the gill passages and is pulled out a gill slit, the tether 20 (which is also passing through the mouth, gill passages, and out a gill slit) is pulled back so as to be somewhat taut, with the elongated member 14 oriented somewhat or substantially orthogonally to the tether 20 (see FIGS. 5B and 6). As illustrated in FIG. 5B, a caught fish is being securely held by the invention acting as a fish stringer. Importantly, a next caught fish, as depicted in FIG. 6, may be placed on the stringer by the user pulling up the elongated member 14 and fish proximate thereto, and repeating the about process of feeding the elongated member 14 through the newly caught fish's mouth, and out a gill slit. Should the elongated member 14 or tether 20 slip out of the user's hand(s), he/she simply grabs the proximate end, which is the fixed second end 20b of the tether 20, and again pulls up the first end 20a, along with the elongated member and any previously caught fish.

Referring again to FIG. 2A, there is depicted a bunching strap 50 provided for holding a gathered and bunched tether 20 of the invention. For example, before the first fish is caught, it may be desirable to gather, bunch and employ the bunching strap 50 for holding the tether, etc. in a bunched state until needed as a caught fish stringer. The embodiment of FIG. 2A may be provided with a pair of extensions 50a and 50b, which may be constructed to include hook and eye tape for securely, yet releasable holding bunched portions.

While there have been described herein a plurality of the currently preferred embodiments of the methods and means of the present invention, those skilled in the art will recognize that other and further modifications may be made without departing from the invention. As such, the foregoing descriptions of the specific embodiments of the present invention have been presented for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A multi-function fishing tool, comprising:

a) a tether having a first end and a second end;

b) a loop formed at the second end of the tether, with the loop arranged for coupling the second end of the tether to an item worn by the user such that the second end is securely attached to the item and the user during fishing activities; and c) an elongated member structured having a first end, a second end, and a middle portion, with the elongated member fixedly coupled to the first end of the tether proximate to the middle portion of the elongated member;

d) with the elongated member arranged for inserting into the mouth of a caught fish, out through a gill slit and employed to securely hold the fish proximate to the first end of the tether, and against the elongated member;

e) the elongated member further structured having each of:
   i) a hook disgorger provided at the first end of the elongated member; and
   ii) a fishing line cutter provided at the second end;

f) where the tether is structured with a measuring tape fixed to and extending along a substantial length of the tether, enabling an individual to additionally readily verify the size of a caught fish by using the measuring tape of the tether before a possible placing of the caught fish upon the tether of the tool.

2. The multi-function fishing tool in accordance with claim 1, wherein the tether is provided by a flattened elongated strap having a first side and a second side, with a measuring tape superposing a length of at least one of the first side and the second side of the strap, and fixed thereto in a permanent fashion.

3. The multi-function fishing tool in accordance with claim 2, wherein the tether is in the range of 75 inches to 85 inches in length, with the measuring tape being at least 60 inches in length.

4. The multi-function fishing tool in accordance with claim 1, wherein a clip is further included that is coupleable to the loop at the second end of the tether, and structured to be selectively fixed to the item worn by the user during fishing activities.

5. The multi-function fishing tool in accordance with claim 1, wherein the elongated member is provided as a tube with the disgorger embodied at the first end by two substantially diametrically opposed notches, with one notch having a notch depth that is at least two multiples deeper than the second notch.

6. The multi-function fishing tool in accordance with claim 5, where the second end of the elongated member provides the fishing line cutter formed in the tube by providing two diametrically opposed unshaped notches, with at least one formed with a sharp recessed cutting edge.

7. A multi-function fishing tool enabling an individual engaging in fishing activities to employ the tool for multiple purposes, including a measuring means and a fish stringer, the multi-function fishing tool comprising:

a) an elongated tether arranged having a first end and a second end;

b) means coupled to the tether at the second end, and structured for being selectively fixed to a piece of gear worn by a user during fishing activities; and c) an elongated member structured having a first end, a second end, and a middle portion, with the elongated member fixedly coupled to the first end of the elongated tether, proximate to the middle portion of the elongated member;

d) with the elongated member arranged for inserting into the mouth of a caught fish, out through a gill slit, and thereby employable as a stringer to securely hold caught fish proximate to the first end of the tether, and up against the middle portion of the elongated member;

e) with the tether further structured having a flexible measuring tape extending along a substantial length of the tether, enabling an individual to rapidly verify the length of a caught fish before a determination is made to placing the caught fish upon the fishing stringer of the tool;

f) where the elongated member is further structured having each of:
   i) a hook disgorger provided at the first end of the elongated member; and
   ii) a fishing line cutter provided at the second end.

8. The multi-function fishing tool in accordance with claim 7, where the elongated member is provided as an elongated tube with the disgorger embodied at the first end as two diametrically opposed notches, with one notch substantially deeper than the second notch.

9. The multi-function fishing tool in accordance with claim 8, where the fishing line cutter is provided at the second end of the elongated member and formed in the tube as at least one angular notch, with a sharpened edge provided within a recessed portion of at least one provided notch and available for cutting fishing line.

10. The multi-function fishing tool in accordance with claim 9, where the notches are formed in the tube as two diametrically opposed angular notches, which are of v-shaped and u-shaped, with each notch provided with a sharpened edge provided within a recessed portion of the notch.

11. A multi-function fishing tool for use in disgorging, line cutting, and fish measuring, while fundamentally serving as a fish stringer for caught fish, the multi-function fishing tool comprising:

a) a tether having a first end and a second end, with a measuring means provided substantially along the entire longitudinal length of the tether, thereby enabling an immediate measuring of a caught fish before placing the caught fish upon the fishing stringer of the fishing tool;

b) an elongated member provided as a tube, and structured having a first end, a second end, and a middle portion, with the elongated member fixedly coupled to the first end of the tether proximate to the middle portion of the elongated member, and with the elongated member further providing:
   i) a hook disgorger provided at the first end of the elongated member by two diametrically opposed notches, with one notch substantially deeper than the second notch; and
   ii) a fishing line cutter provided at the second end of the elongated member and formed in the tube as a plurality of angular notches, provided at the second end, with sharp edges provided within the recesses of the notches for cutting fishing line;

c) a clip, provided at the second end of the tether, with the clip structured to be selectively securely fixed to a piece of a gear worn by a user during fishing activities;

d) with the elongated member further arranged for inserting into the mouth of a caught fish, and out through a gill slit, and employed to securely hold the fish proximate to the first end to the tether, and against the middle portion of the elongated member e) wherein the included measuring means is provided for enabling an individual to readily verify the size of a caught fish.

12. The multi-function fishing tool in accordance with claim 11, wherein the tether is provided of a flattened elongated strap having a first side and a second side, with a measuring tape superposing at least a portion of at least one of the first side and the second side of the strap.

13. The multi-function fishing tool in accordance with claim 11, wherein the clip is provided as a ring clip included at the second end of the tether for selectively fixing the tether to an item worn by the user during fishing activities.

14. The multi-function fishing tool in accordance with claim 13, further including an integral bunching strap formed at an end of the tether, and structured for releasably holding a gathered and bunched tether.

15. The multi-function fishing tool in accordance with claim 14, wherein the integral bunching strap is structured having a pair of extensions.

16. The multi-function fishing tool in accordance with claim 15, wherein the pair of extensions of the integral bunching strap are structured including hook and eye tape for securely, yet releasable, holding bunched portions of the tether.

* * * * *